Nov. 12, 1963 C. J. WEIDKNECHT ETAL 3,110,863

PHASE MODULATION TRANSMITTER

Filed Sept. 21, 1959

INVENTORS
Charles J. Weidknecht
Charles Rosen,
BY Paris, Haskell and Levine
ATTORNEYS 3,110,863
Patented Nov. 12, 1963

3,110,863
PHASE MODULATION TRANSMITTER

Charles J. Weidknecht and Charles Rosen, Philadelphia, Pa., assignors to Vector Manufacturing Company, a corporation of Pennsylvania Filed Sept. 21, 1959, Ser. No. 841,124
13 Claims. (Cl. 325—105)

Figures 1, 2:
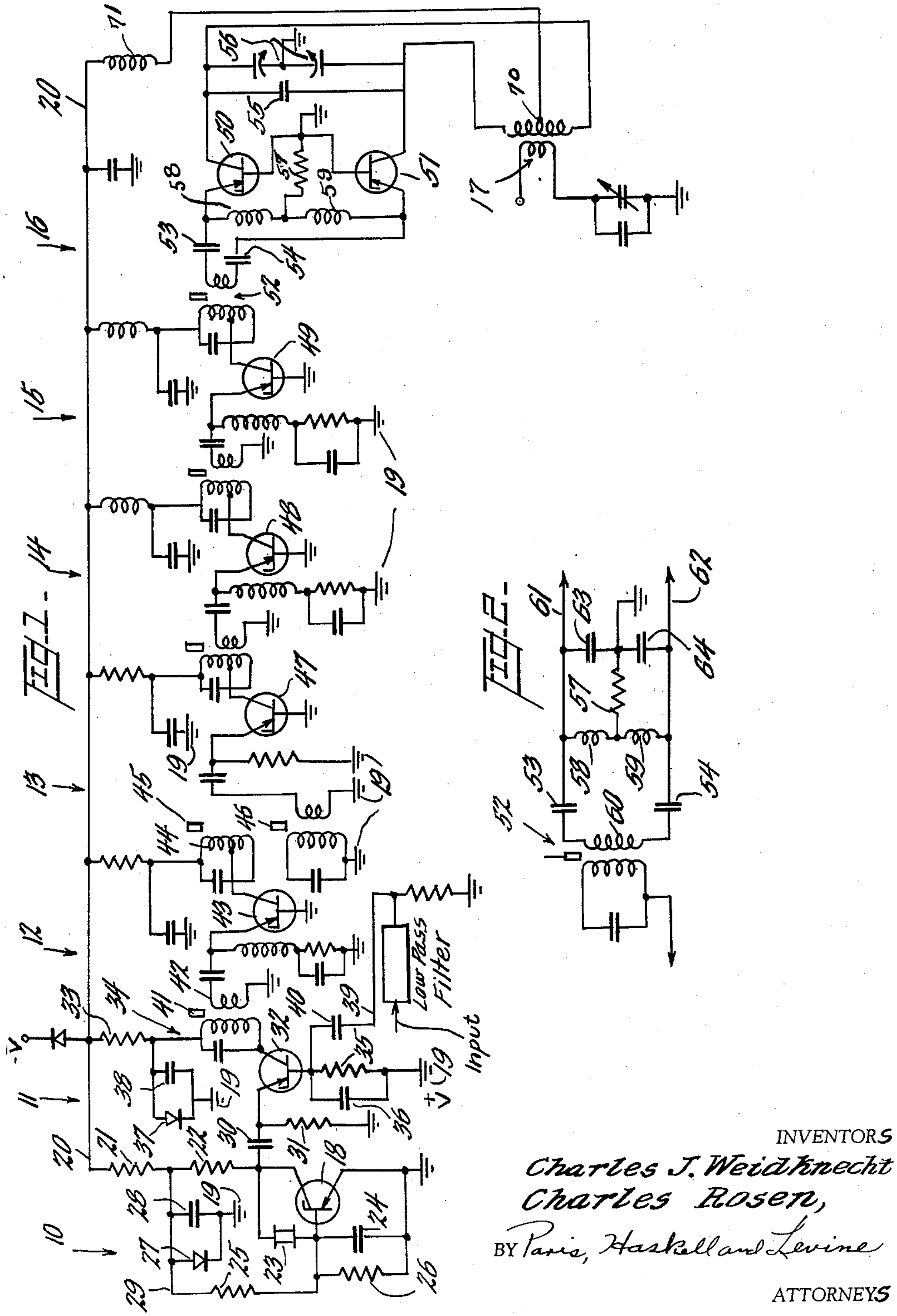

This invention generally relates to improvements in R.-F. transmitters for producing a phase modulated carrier signal and is particularly well adapted for use as a mobile telemetering transmitter for aircraft and missiles were factors such as small size and weight, as well as low power consumption are paramount consideration.

It is accordingly a principal object of the invention to provide a phase modulated transmitter of miniature size, weight and low power consumption compatibly with providing the necessary stability, shock resistance and related characteristics necessary for such mobile applications.

A further object is to provide such a transmitter employing completely solid state elements.

A still further object is to provide an R.-F. phase modulated transmitter employing a unique configuration of transistor circuits supplying wide range phase modulation coupled with improved stability and insensitivity to variations in temperature or voltage supply variation.

Other objects and additional advantages will be more readily understood by those skilled in the art after a detailed consideration of the following specification taken with the accompanying drawings wherein:

FIG. 1 is an electrical schematic drawing illustrating an R.-F. transmitter according to the present invention; and FIG. 2 is an electrical schematic drawing showing further details of the coupling circuit of FIG. 1 for impedance matching the final power amplifying stage.

Referring now to the drawing for a detailed consideration of one preferred embodiment according to the present invention, there is shown a high frequency transmitter system including an oscillator circuit stage generally designated 10, a separate modulator circuit stage 11, a plurality of frequency multiplier stages 12, 13, 14, and 15, and a power amplifier stage 16, all being connected in cascaded relationship to produce a phase modulated carrier signal over the secondary winding of an output transformer 17 leading to an antenna or other load (not shown).

Although not limited to such application, the present invention is particularly well suited for use as a telemetering transmitter operating in the frequency range between 215 and 260 megacycles and producing a wide range phase modulated carrier. To obtain this wide range modulation, the oscillator stage 10 is adapted to operate at a considerably lower sub-harmonic frequency than the desired carrier frequency, and this sub-harmonic frequency is then phase modulated by means of modulator stage 11. The resulting phase modulated signal is then multiplied in frequency by a plurality of stages 12, 13, 14, and 15 until the desired high frequency is obtained thereby to also proportionally increase the amount of phase modulation. All of the stages are constructed of components of minimum size, weight and power consuming capacity and preferably all employ transistors, as shown.

Referring specifically to the oscillator stage 10, a preferred embodiment comprises a three element transistor 18 having its emitter element being energized by a positive source of potential over ground line 19 and its collector element energized by an equal valued negative source of potential on line 20 through first and second series connected resistors 21 and 22. To provide the necessary feed back for sustaining oscillations at constant frequency, a crystal 23 interconnects the base element with the collector element to establish a stable resonant frequency and a coupling capacitor 24 further interconnects the base element with the emitter element to complete the feedback loop. For biasing the base element at its proper position along the transistor characteristic curves, the base element is also connected to the central junction of a potential divider circuit comprised of series connected resistors 25 and 26 having opposite ends thereof being energized from the positive and negative sources of potential, as shown.

Since the frequency of the oscillator stage 10 may be varied by changes in the D.-C. energizing potential, a reversely poled or Zener diode 27, paralleled by a filter capacitor 28, is connected from line 29 leading to the negative potential supply, to ground line 19 leading to the positive supply, thereby to stabilize the voltage potential energizing the various elements of the transistor 18 and prevent changes in the voltage sources from exerting any measurable effect on the frequency of the oscillator.

The constant frequency sub-harmonic carrier signal being generated by the oscillator stage 10 is taken from the collector element of transistor 18 and thence directed through a coupling capacitor 30 and resistor 31 to the emitter element of the separate modulator transistor 32. According to the present invention, this separate modulator stage is provided to supply three functions. Primarily, the modulator stage provides wide range phase modulation of the sub-harmonic carrier signal as is believed evident. However, the separate modulator stage is also effectively decoupled from the oscillator thereby to substantially prevent loading of the oscillator despite a varying modulating signal and thus enable the oscillator to continuously function at constant frequency as desired despite wide range modulation and slow or rapid changes in the modulating signal.

In addition to these functions, there has heretofore existed the problem of preventing independent oscillations in transistor modulators due to the fact that the interelement capacitance existing between base and emitter elements and base and collector elements is sufficiently large to normally provide feedback therebetween and sustain oscillation at the high frequencies involved. According to the present invention, however, this problem is eliminated by the unique configuration of the combined oscillator and modulator stages. More specifically, the base element of modulator transistor 32 is preferably grounded with respect to alternating currents through the positive source of potential 19, the carrier signal is introduced at the emitter element, and the modulated carrier is taken from the collector element. With this configuration, therefore, the smaller interelement capacitance (large reactance) between the collector element and base, and the emitter element and base cannot sustain oscillations, whereas the larger interelement capacitance (smaller reactance) between the emitter and collector is utilized in obtaining the phase modulation. Consequently, the grounded base configuration of the modulator stage taken with the grounded emitter configuration of the oscillator stage provides the desired wide range modulated carrier without variably loading the oscillator or introducing undesired independent oscillations therein.

Returning to the modulator stage, the collector element of transistor 32 is energized from the negative source over line 20 and through a resistor 33 and tuned circuit generally designated 34, and the base element thereof is self biased by means of a parallel connected resistor 35 and capacitor 36 to alternating current ground line 19, which as discussed above is energized by a positive D.-C. source. In common with the oscillator stage 10, the D.-C. potential feeding the modulator transistor 32 is stabilized and made constant by connecting a Zener diode 37 and paralleling capacitor 38 intermediate the positive D.-C. energized ground line 19 and the junction between resistor 33 and resonant circuit 34.

In operation, a modulating signal is introduced over line 39 and through coupling capacitor 40 to the base element of transistor 32 thereby varying the electrical conduction between the emitter and collector elements. However, since the D.-C. potential is applied from the collector to the base elements, the equivalent circuit shows that this modulating signal serves to vary the phase of the voltage existing across the collector to base elements due to the values of the interelement capacitance existing between the emitter to collector and the collector to base taken with the fact that the transisor is operaing in the megacycle frequency range. The net result is that the sub-harmonic oscillator signal appearing across the resonant circuit 34 is phase shifted by an amount proportional to the modulating signal over line 39 whereby the circuits 10 and 11 function as a phase modulated oscillator having a wide range of phase shift.

To increase this sub-harmonic frequency to the much higher frequency desired and at the same time to proportionally increase the phase shift range, the resonant circuit 34 is tuned to a higher harmonic of the oscillator signal whereby the voltage appearing across the tuned circuit 34 is a higher harmonic multiple of the modulator signal but reduced in amplitude. The tuned circuit 34 is preferably formed of a high Q transformer whose primary winding is in parallel with a capacitor, as shown, with the circuit being tuned by a suitable core slug 41 or the like. The secondary winding 42 of the transformer energizes the emitter element of a grounded base amplifying transistor 43.

Transistor 43 serves to amplify the lower order harmonic signal and is also provided with an output resonant circuit 44 comprised of coupled transformers and parallel connected capacitors tuned by slugs 45 and 46 to a higher harmonic frequency than the input tuned circuit 34. Thus transistor 43 provides a first frequency multiplication stage serving to increase the phase modulated carrier by a harmonic multiple of the oscillator frequency.

In a similar manner, stages 13, 14, and 15 are preferably identical frequency multiplying stages in cascaded array and including transistors 47, 48, and 49, each being provided with tuned transformer tank circuits at the input and output thereof and with each tuned circuit being progressively adjusted to produce a higher harmonic multiple frequency than the last thereby to progressively increase the frequency in harmonic multiples of that desired.

It is to be particularly noted that each of the tuned frequency multiplier stages 12, 13, 14, and 15 are arranged with the base elements of the transistors being grounded to A.-C. and energized with a positive D.-C. potential and with the input circuits being connected to the emitter element and the output circuit to the collector element. The source of D.-C. energizing potential is applied across the collector to base elements in each stage. By this circuit configuration, optimum advantage is taken of the interelement capacitance at the high frequency involved in achieving maximum gain and frequency response.

It is also to be particularly noted that a common positive and negative source of potential is employed to energize and bias all stages of the transmitter and that all stages, with the exception of the oscillator stage 10, are of the grounded base variety. The reason for this unique configuration is to obtain optimum stability despite minor variation in the energizing and biasing sources. More specifically, it is known that the reactive components or interelement capacities of the transistors vary with change in the biasing potentials. Accordingly, this effect is minimized by using a common voltage source for all emitter and collector elements.

To obtain the necessary power amplification of the phase modulated carrier signal, the final stage 16 of the transmitter is preferably formed of a pair of differentially connected power amplifying transistors 50 and 51. The base elements of transistors 50 and 51 are commonly connected together and to the A.-C. ground line 19, and the input signal is differentially passed from the emitter elements of each transistor to the collector elements thereof.

Considering the input to the power amplifying stage 16, the phase modulated carrier is taken from the secondary winding of tuned transformer 52 and differentially directed through capacitors 53 and 54 to the emitter elements of transistors 50 and 51. The collector elements of each transistor 50 and 51 are connected to opposite terminals of the primary winding of output transformer 17 whose center tap 70 receives negative D.-C. potential over line 20 and through a choke coil 71 which serves to prevent the A.-C. carrier from entering the D.-C. source. Consequently, the phase modulated signal differentially passes from the emitter to collector elements of each transistor and is applied in push-pull across the output transformer 17 and thence coupled to the load (not shown).

The output transformer 17 is, of course, tuned to the desired frequency by means of parallel connected fixed and variable capacitors 55 and 56, respectively, and the emitter elements of both transistors in the input circuit are supplied with a positive bias potential by being D.-C. coupled to the positive source of potential on line 19 through a bias resistor 57 and choke coils 58 and 59, as shown, the choke coils 58 and 59 preventing the A.-C. carrier from being grounded through line 19.

It is to be particularly noted that the final frequency multiplier stage 15 is impedance matched to the power amplifier stage 16 by a two section impedance matching network. This two stage network is obtained by employing the interelement capacities existing between the emitter and base elements of the power transistors 50 and 51 as best illustrated in FIG. 2. Referring to FIG. 2 for an understanding of this two stage impedance matching circuit, there is shown the tuned transformer 52 leading from the collector element of frequency multiplier stage 15 and the remaining reactive and resistive elements intermediate this stage and the power amplifying stage 16. As shown, the phase modulated carrier signal appears across the secondary winding 60 of transformer 52 and thence is differentially directed through capacitors 53 and 54, as described above, to pass over lines 61 and 62 to the emitter elements of transistors 50 and 51, respectively. However, at the high frequencies involved, the interelement capacity 63 existing between the emitter and base elements of transistor 50 provides a significant reactance in the circuit as shown between lines 61 and A.-C. ground, as does the similar capacitance 64 of transistor 51. Consequently, the coupling capacitance 53 forms with the interelement capacitance 63 of transistor 50 a first potential divider circuit for line 61 and the coupling capacitance 54 forms with the interelement capacitance 64 of transistor 51 a second potential divider circuit for line 62 with a net result that the transformer 52 and capacitor potential dividers, as shown, provide a two stage impedance matching network coupling the final frequency multiplying stage 15 with the power amplifying stage, as desired.

We claim:

1. In a high frequency phase modulated transmitter of improved stability, a crystal controlled transistor oscillator including a transistor having emitter, collector, and base elements, and a crystal interconnecting the base and collector elements, resistance means providing a D.-C. bias on the base element and means applying a D.-C. potential across the emitter and collector elements, a grounded base transistor phase modulator comprising a transistor having base, collector and emitter elements, means coupling the collector element of the oscillator transistor to the emitter element of the modulator transistor, and means introducing a modulating signal intermediate the ground connection and the base element of the modulator transistor, a plurality of transistor frequency multiplication stages and tuned circuit coupling means interconnecting said modulator and said frequency multiplier stages in cascaded relation.

2. In the transmitter of claim 1, a differential power amplification stage including a pair of transistors in back-to-back relation, each having emitter, collector, and base elements with the base elements thereof commonly connected to ground, and tuned resonant circuit means differentially coupling the last of said cascaded frequency multiplier stage to the emitter elements of said power amplifier transistors.

3. In the transmitter of claim 2, a capacitor in series circuit relation with the emitter element of each of said differentially connected transistors in the power stage thereby providing in conjunction with the internal capacitance of the transistor a potential divider to impedance match said last frequency multiplying stage with said power amplifying stage.

4. In a phase modulated transmitter operating in the megacycle frequency range, a crystal controlled transistor oscillator, a grounded base phase modulator comprising a transistor having a grounded base element and connected to receive the carrier signal from said oscillator at its emitter element and produce a phase modulated carrier signal from its collector element upon receiving a modulating signal intermediate its base element and ground, and means for multiplying the frequency of the phase modulated carrier thereby to increase many fold the oscillator frequency and proportionally increase the phase modulation, the interelectrode capacity between the emitter and collector elements being sufficiently large at the frequency of the oscillator to transmit a phase displaced signal therethrough in the magnitude range of the modulated signal from emitter to collector electrodes whereby the signal at the collector electrode is phase displaced from the oscillator signal in proportion to the modulating signal.

5. In the transmitter of claim 4, said multiplying means including a transistor having base, emitter, and collector elements with the base element being grounded and the emitter and collector elements each being coupled to resonant circuits tuned to different frequencies in the ratio of frequency multiplication desired.

6. In a phase modulated transmitter, a crystal controlled transistor oscillator having base, emitter, and collector elements with the emitter element thereof grounded with respect to A.-C. currents and with the crystal interconnecting the base and collector elements, means phase modulating said oscillator comprising a second transistor having base, collector and emitter elements with the base element thereof connected to receive a modulating signal for substantially controlling the effective resistance between emitter and collector elements, means coupling the emitter element of the modulating transistor to the collector element of said oscillator, and a tuned frequency circuit in the output of the modulating transistor to increase the frequency and phase modulation proportionally to a harmonic of the oscillator frequency, the interelectrode capacity between the emitter and collector elements being large at the frequency of the oscillator to provide a constant phase displaced signal component therethrough in the range of magnitude of the varying signal component from the emitter to collector electrodes.

7. In the device of claim 6, means stabilizing the potential energizing said oscillator and modulator transistors, said means including a Zener diode in circuit with the collector elements of each transistor.

8. In a phase modulated transmitter having great stability, a crystal controlled transistor oscillator having a grounded emitter element, a crystal interconnecting the base and collector elements and a Zener diode in circuit with the collector to stabilize the D.-C. potential applied thereto, a phase modulator transistor having emitter, collector and base elements with the base being connected to a ground through circuit means introducing a modulating signal, means coupling the emitter of the modulator transistor to said oscillator, and a tuned resonant circuit connected as an output load in circuit with the collector element of the modulator.

9. In the transmitter of claim 8, a plurality of frequency multiplier stages responsive to the output of the modulator for progressively increasing the oscillator frequency by harmonics thereof.

10. In the transmitter of claim 9, each frequency multiplier stage including a transistor having base, emitter, and collector elements, with the base element grounded with respect to A.-C. signals and the emitter element connected to receive the transmitter signal.

11. In a transmitter for megacycle frequency transmission, a stabilized oscillator producing a high frequency signal, a phase modulator comprising a transistor having base, emitter and collector electrodes, means connecting the emitter and collector electrodes of the modulator in series with the oscillator signal, and means introducing a modulating signal to the base electrode, the interelectrode capacity from the emitter electrode to the collector electrode being large at the oscillator frequency to provide a shunt path through the transistor that is constantly phase displaced from the resistive signal component passing from the emitter electrode to the collector electrode and having a constant amplitude in the range of amplitude of the resistive signal component, whereby the vector sum of the two components at the collector electrode is phase displaced from the oscillator signal in proportion to the modulating signal.

12. A transistor phase modulator comprising a transistor having a base electrode, emitter electrode, and collector electrode, means introducing an oscillating signal to the emitter electrode, means coupling a load circuit to the collector electrode, and means introducing a variable amplitude modulating signal to the base electrode, said transistor having a large interelectrode capacity between the emitter collector electrodes at the frequency of the oscillating signal to transmit a constant amplitude signal component from the oscillating signal to the load circuit therethrough, and said transistor producing a variable amplitude signal component from the emitter electrode to the collector electrode and to the load proportional in amplitude to the modulating signal and in an out-of-phase relationship with the interelectrode capacity signal component, whereby the vector sum of the two signal components at the load is varied in phase from the oscillating signal in proportion to the amplitude of the modulating signal.

13. In a high frequency transmitter having an oscillator, modulator, and power amplifier, a high frequency coupling circuit for impedance matching a signal to the power amplifier, said power amplifier including a transistor having base, emitter, and collector electrodes, with the signal being coupled from the emitter electrode to the collector electrode and being controlled by energizing the base electrode, said high frequency coupling circuit comprising a capacitor in series with the emitter and collector electrodes and providing in conjunction with the interelectrode capacity from the emitter to base electrodes a potential divider to impedance match the signal to the power amplifier.

References Cited in the file of this patent

UNITED STATES PATENTS

| | | |
|---|---|---|
| 2,298,930 | Decino | Oct. 13, 1942 |
| 2,587,294 | Dorbec | Feb. 26, 1952 |
| 2,589,542 | De France et al. | Mar. 18, 1952 |
| 2,606,284 | Van Weel | Aug. 5, 1952 |
| 2,682,639 | Haner | June 29, 1954 |

(Other references on following page)

| | | |
|---|---|---|
| 2,702,316 | Friend | Feb. 15, 1955 |
| 2,714,702 | Shockley | Aug. 2, 1955 |
| 2,812,390 | Van Overbeek | Nov. 5, 1957 |
| 2,843,681 | Van Overbeek | July 15, 1958 |
| 2,853,615 | Kircher | Sept. 23, 1958 |
| 2,857,573 | Lin | Oct. 21, 1958 |
| 2,870,421 | Goodrich | Jan. 20, 1959 |
| 2,887,573 | Hruska | May 19, 1959 |
| 2,888,648 | Herring | May 26, 1959 |
| 2,892,045 | Aronson | June 23, 1959 |
| 2,935,606 | Harrison et al. | May 3, 1960 |

| | | |
|---|---|---|
| 2,936,424 | Steggerda | May 10, 1960 |
| 2,972,120 | Kircher et al. | Feb. 14, 1961 |

OTHER REFERENCES

Jaffe et al.: "Frequency and Phase Modulation," Proc. I.R.E., vol. 33, No. 3, March 1945, pp. 200, 201.

Lo et al.: Transistor Electronics, September 26, 1955, pages 225–240.

Article: "A Transistorized 150 M.C.F.M. Receiver," pages 693–699 of Proceedings of the IRE for April 1958.

Circuit for Space Probes, Bennett et al., Electronics, June 19, 1959, pages 55–57 relied on.